(12) United States Patent
Bühring et al.

(10) Patent No.: US 8,557,375 B2
(45) Date of Patent: Oct. 15, 2013

(54) THERMOPLASTIC FILM FOR AIRBAG COVERS

(75) Inventors: Jürgen Bühring, Göppingen (DE);
Katja Fischer, Marktrodach (DE);
Völker Hülsewede, Göppingen (DE);
Jürgen Marquardt, Freiburg (DE);
Hartmut Harnisch, Grefrath (DE)

(73) Assignee: Benecke-Kaliko AG, Hannover (DE)

( * ) Notice: Subject to any disclaimer, the term of this patent is extended or adjusted under 35 U.S.C. 154(b) by 643 days.

(21) Appl. No.: 12/540,422

(22) Filed: Aug. 13, 2009

(65) Prior Publication Data

US 2009/0304973 A1    Dec. 10, 2009

Related U.S. Application Data

(63) Continuation of application No. PCT/EP2008/050357, filed on Jan. 15, 2008.

(30) Foreign Application Priority Data

Feb. 13, 2007 (DE) ......................... 10 2007 007 619
Mar. 30, 2007 (DE) ......................... 10 2007 015 765

(51) Int. Cl.
*B32B 27/08* (2006.01)
*B60R 21/215* (2011.01)
(52) U.S. Cl.
USPC ................. 428/304.4; 280/727; 280/728.3; 280/752; 428/43; 428/98; 428/131; 428/156

(58) Field of Classification Search
USPC ........... 428/304.4, 43, 131, 156, 98; 280/727, 280/728.3, 752
See application file for complete search history.

(56) References Cited

U.S. PATENT DOCUMENTS

| 5,863,064 | A | 1/1999 | Rheinlander et al. |
| 6,224,090 | B1 | 5/2001 | Lutze et al. |
| 6,753,057 | B1 | 6/2004 | Gardner, Jr. |
| 2005/0173047 | A1* | 8/2005 | Buhring et al. ............... 156/220 |
| 2007/0018435 | A1* | 1/2007 | Muller et al. ............. 280/728.3 |

FOREIGN PATENT DOCUMENTS

| DE | 19533367 A1 | 3/1997 |
| DE | 19636428 A1 | 3/1998 |
| DE | 10055546 A1 | 9/2001 |
| DE | 10244311 A1 | 4/2004 |
| EP | 1518662 A1 | 3/2005 |
| EP | 1745989 A1 | 1/2007 |

OTHER PUBLICATIONS

International Search Report dated Jun. 20, 2008.

* cited by examiner

*Primary Examiner* — Brent Ohern
(74) *Attorney, Agent, or Firm* — Laurence A. Greenberg; Werner H. Stemer; Ralph E. Locher

(57) ABSTRACT

A thermoplastic film for airbag covers contains a cover layer and a foam layer. The cover layer is made of at least two layers, having an outer layer and an inner layer, and an elongation at tear of the inner layer of the cover layer and of the foamed layer is considerably less than the elongation at tear of the outer layer of the cover layer.

19 Claims, 2 Drawing Sheets

THERMOPLASTIC FILM FOR AIRBAG COVERS

CROSS-REFERENCE TO RELATED APPLICATION

This is a continuation, under 35 U.S.C. §120, of copending international application No. PCT/EP2008/050357, filed Jan. 15, 2008, which designated the United States; this application also claims the priority, under 35 U.S.C. §119, of German patent application No. DE 10 2007 007 619.5, filed Feb. 13, 2007 and German patent application No. DE 10 2007 015 765.9, filed Mar. 30, 2007; the prior applications are herewith incorporated by reference in their entirety.

BACKGROUND OF THE INVENTION

Field of the Invention

The invention relates to a thermoplastic film, in particular for airbag covers for the interior trim of motor vehicles, containing a compact cover layer with a three-dimensionally structured surface, produced for example by an IMG process, as described further below, or else by embossing processes. The film has a foamed layer on the underside, is applied in a shaping processing step to a support corresponding to the form of the component and thereby receives its component form.

Thermoplastic moldings, molded films or slush skins for the interior trim of motor vehicles are largely known, and are used for example for the interior trim in vehicles, that is to say as a covering of dashboards, door inserts, sun visors, etc. Such moldings usually contain a multilayered underfoamed plastic film which has on its upper side a three-dimensionally structured, embossed surface, namely a so-called patterning or graining, of a wide variety of forms and configurations.

The moldings or molded films contain a compact upper layer, namely the cover or decorative layer, with a Shore hardness of approximately Shore A 60 to Shore D 50, which is provided with the embossed or molded-in surface, and a low-density foam layer, laminated/adhesively attached on the underside as a lower layer, which provides a pleasant feel, i.e. a nicely "soft" touch, of the covering. In this case, the upper layer is also known as a "compact film".

Both the upper layer and the lower layer of the moldings/molded films may in this case be formed of different compositions and different basic raw materials, that is to say for instance of plastics such as polyvinyl chloride (PVC), polypropylene (PP), polyolefin (TPO), etc., or a combination of such materials or similar materials.

In the prior art, various processes are known for the production of such slush skins, for example rolling processes for producing "continuous" film webs or processes for producing individual ready-from-the-mold slush skins. An example of this is the "Inmold-Graining process" (IMG process), which has developed as a special process from the negative thermoforming process. By contrast with standard thermoforming processes, in which the molding into the three-dimensional structure corresponding to the geometry of the component is performed by moving into the film a thermoforming die forming the later contour of the component, in the case of negative thermoforming a film is drawn into a negative mold, for example by vacuum. Inmold graining is a special refinement of negative thermoforming in which not only the structure corresponding to the geometry of the component but also the later grain structure is introduced as a negative into the surface of the mold.

The film that is the subject of the invention is particularly suitable and configured for production by the IMG process or else by rolling processes or embossing processes.

For the subsequent application of such a molding or such a molded film to a dashboard support or to a prefabricated support part, produced for example from fiber-reinforced paperboard, for a side-door insert, a series of further forming processes apart from thermoforming are known, such as for instance pressing processes in which the film is pressed against molds or against the supports and receives its component form.

As already explained above, such a film, i.e. such a molding, therefore contains a composite of multiple layers, the surface having a melt viscosity adapted to the processing process and the foamed lower film being stably formed. The use of such a film as a covering of a support in conjunction with the airbag triggering devices that are fitted as standard in modern-day vehicles is only possible if the film that covers for example the entire dashboard, and consequently also the covers over the triggering devices of the airbag, is weakened along a seam/tear-open seam to tear open during deployment of the airbag. This weakening takes place in the prior art by various types of subsequent working.

German patent No. DE 100 55 546 C2 discloses in this respect a process for creating weakening structures which run along a predetermined breaking line and in which tear-open seams are arranged on the rear side of the airbag covering/the thermoplastic film with a blade as a cutting and stamping tool, by the blade being moved along a tear-open line and made to perforate the airbag trim and withdrawn again in a certain intermittent cycle.

It is also known to produce predetermined breaking lines by a laser beam treatment, in which a laser beam burns or cuts part of the film thickness. For instance, published non-prosecuted German patent No. DE 196 36 428 A1 discloses an apparatus which has a laser for creating weakening structures in the form of perforation lines. In this case, blind holes are burned into the airbag trim at predetermined intervals.

A disadvantage of both disclosed procedures is that, over time, the material weakening created on the rear side generally also becomes visible on the outer side as a result of material regression.

Published, European patent application EP 1 518 662 A1 shows a process for producing a weakening line in an airbag cover in which a sonotrode placed onto the cover/film generates heat by ultrasound, which creates a mechanical weakening in a textile outer layer of the covering, but it is intended that the textile surface structure that is in fact present is disturbed only a little by the weakening, presumably because the pattern of the predetermined breaking line is not especially noticeable in the pattern of the textile. In the case of synthetic leather surfaces for example, however, a clearly noticeable weakening line would be evident here.

Since a strong trend toward improving the impression of quality can be observed in the area of automobile interiors, neither the one nor the other irregularities are acceptable in the visible regions of the surface.

SUMMARY OF THE INVENTION

It is accordingly an object of the invention to provide a thermoplastic film for airbag covers that overcomes the above-mentioned disadvantages of the prior art devices of this general type, which is suitable for deforming operations, such as for example thermoforming, without loss of quality, which has an impression of high quality of the surface and can also be used in the region of airbag triggers without extensive additional working.

With the foregoing and other objects in view there is provided, in accordance with the invention, a thermoplastic film. The film contains a compact cover layer having a three-dimensionally structured surface and a foamed layer disposed on an underside of the compact cover layer. The thermoplastic film is applied in a shaping processing step to a support corresponding to a form of a component and thereby receiving its component form. The compact cover layer is of an at least two-ply form, containing an outer ply and an inner ply adjacent the foamed layer. The inner ply of the compact cover layer and the foamed layer have an elongation at tear being less than an elongation at tear of the outer ply of the compact cover layer.

In this case, the cover layer is of an at least two-ply form and therefore contains at least an outer ply and an inner ply, adjacent the foamed layer. The inner ply of the cover layer and the foamed layer have an elongation at tear which is considerably less than the elongation at tear of the outer ply of the cover layer. This structure has the effect that, when the airbag generator is triggered, the film tears open without any problems and makes inflation of the airbag possible.

In the prior art, that was previously not the case with films without any additionally introduced weakening lines. This is so because, if a normal film without a weakened cross section is stretched over an airbag opening and then the airbag is triggered, the airbag flap is made to hit the foam by the airbag, breaking the foam. With the conventional layer structure, as events proceed the flap impacts the compact and generally single-ply cover layer, which, on account of its significantly higher tearing resistance and extensibility, does not immediately break but is initially elongated. This causes a detachment of the upper layers of the foam from the film, which has the consequence that further extensible film material is available. Consequently, the distance over which elongation must occur altogether before breakage occurs, and consequently the period of time required for the opening of the airbag, is much longer. In tests with such constructions it has been possible to observe in tensile elongation studies analogous to DIN 527-3 that, after breaking of the foam, the elongation of the cover layer takes place to values of up to 1,200% of the original dimensions before the film tears. This is undesired and has led in the art to the introduction of weakening lines.

With the film formed as provided by the invention, in such a way that the inner ply of the compact cover layer has a tearing resistance and elongation at tear that is well below the values of the outer ply of the compact cover layer, it is now possible to dispense with the introduction of weakening lines, since tearing of the overall construction has been successfully made to take place at the moment at which the foamed layer also tears.

With the three-ply film described, a so-called trilaminate, it has been possible to observe in tensile elongation tests according to DIN 527-3 a behavior that meets the requirements for the forming of airbag cover films and has a significantly lower elongation at tear of the overall construction. Specifically forming the layers in such a way has the overall effect of providing a film that looks good and is structurally stable as well as uniformly compliant, does not have any visible seam regression in the material and, as a result of its construction-dependent and material-dependent level of resistance and elongation behavior, is particularly suitable for use in the region of airbag triggering devices.

Advantageous developments consist in that the elongation at tear of the inner ply on breaking in the longitudinal direction is less than or equal to 600% and in the transverse direction less than or equal to 500% of the respective original dimension. Particularly suitable ranges of this development are characterized in that the elongation at tear of the inner ply on breaking in the longitudinal direction is less than or equal to 500%, preferably less than or equal to 400%, and in the transverse direction less than or equal to 400%, preferably less than or equal to 300%, of the original dimension. In particular together with the advantageous form such that the tearing resistance of the inner ply in the longitudinal direction and in the transverse direction is 8 to 25 MPa, preferably 10 to 15 MPa, a balanced tearing behavior with at the same time a good formulation of the film for a structural strength that is adequate for the deforming processes/thermoforming processes used is obtained with the conventional film thicknesses and dimensions.

This is supported by a further advantageous form in which the individual plies of the compact cover layer have a thickness of in each case 0.2 to 0.6 mm, preferably a thickness of 0.2 to 0.4 mm. Consequently, these films are still not too thin on one side to achieve a grain of good quality in the IMG process or in positive thermoforming and have on the other side a thickness which still does not have too great an effect on material costs. These film thicknesses/forms may of course be adapted and produced with a wide variety of materials.

A further advantageous form consists in that the elongation at tear of the foamed layer on breaking in the longitudinal direction is less than or equal to 400% and in the transverse direction less than or equal to 300% of the respective original dimension. Particularly suitable ranges of this development are characterized in that the elongation at tear of the foamed layer on breaking in the longitudinal direction is less than or equal to 300%, preferably less than or equal to 200%, and in the transverse direction less than or equal to 200%, preferably less than or equal to 150%, of the respective original dimension.

In particular in conjunction with an advantageous form of the thickness of the foamed layer of 0.5 to 4 mm, a precisely adapted design of the elongation behavior for the conventional layer thicknesses and cover layer materials in automobile construction is obtained. This is also supported by a further advantageous form, which consists in that the foamed layer has a density of 40 to 300 kg/m$^3$, preferably a density of 40 to 200 kg m$^3$. Such a form facilitates the processing and production of the films, whereby a balanced ratio between flexibility of the material and required structural strength for the thermoforming and the desired tearing behavior is obtained.

Such a film is particularly suitable for the covering of an interior trim part for a motor vehicle, preferably a dashboard, the cover film being of a multiply form in the way according to the invention, at least in the region of the airbag covers or in the region of the tear-open seams of the airbag covers.

Other features which are considered as characteristic for the invention are set forth in the appended claims.

Although the invention is illustrated and described herein as embodied in a thermoplastic film for airbag covers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
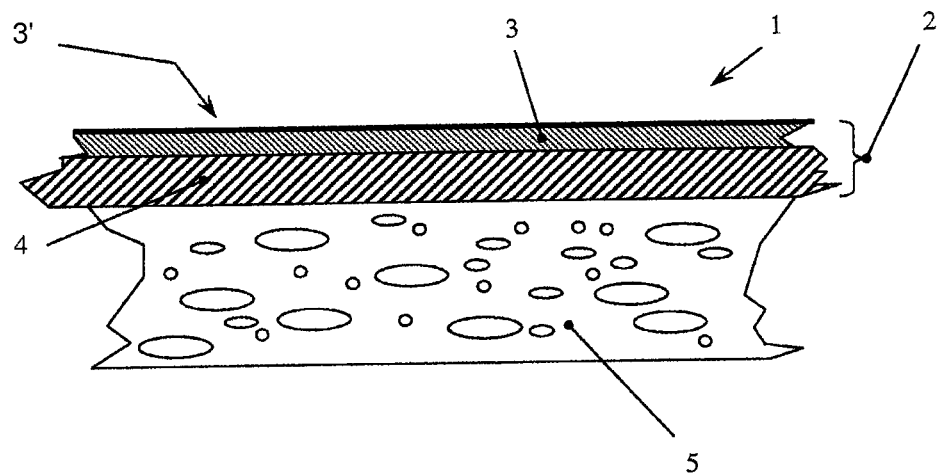
FIG. 1 is a diagrammatic, sectional view showing a structure of a thermoplastic film according to the invention.

Referring now to the drawings of the invention in detail, and first in particular to FIG. 1 thereof, there is shown a structure of a thermoplastic film 1 with a multilayered uniformly compliant cover layer 2 without weakening lines, which is of a two-ply form here, namely with an outer ply 3 and an inner ply 4, which is adjacent the foamed layer 5. As is shown in FIG. 1, the inner ply 4 has a substantially uniform thickness and the outer ply 5 has a substantially uniform thickness. The film serves for covering a motor vehicle dashboard in a region of a passenger airbag.

The inner ply 4 of the cover layer and the foamed layer 5 have an elongation at tear which lies significantly below the elongation at tear of the outer ply 3 of the cover layer 2. The thermoplastic film 1 is provided with an embossed three-dimensionally structured surface 3' on its outer cover layer, that is to say with a grain embossed on the outside by rotary embossing.

In this case, the cover layer has a total thickness of 0.8 mm, which is made up of a thickness of the lower ply 4 of 0.4 mm and the thickness of the upper ply 3 of likewise 0.4 mm.

The foamed layer 2 has a layer thickness of 2 mm.

Figure 2:
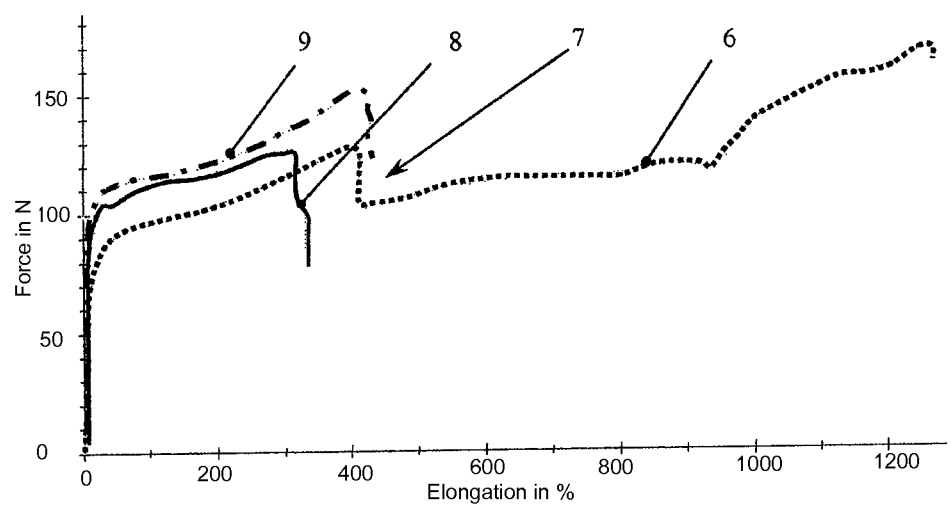
FIG. 2 is a graph showing tearing and elongation behavior of films according to the invention in a longitudinal direction in comparison with a film from the prior art.

FIG. 2 shows the tearing and elongation behavior, determined in a test, of the film according to the invention in the longitudinal direction in comparison with a film from the prior art.

Figure 3:
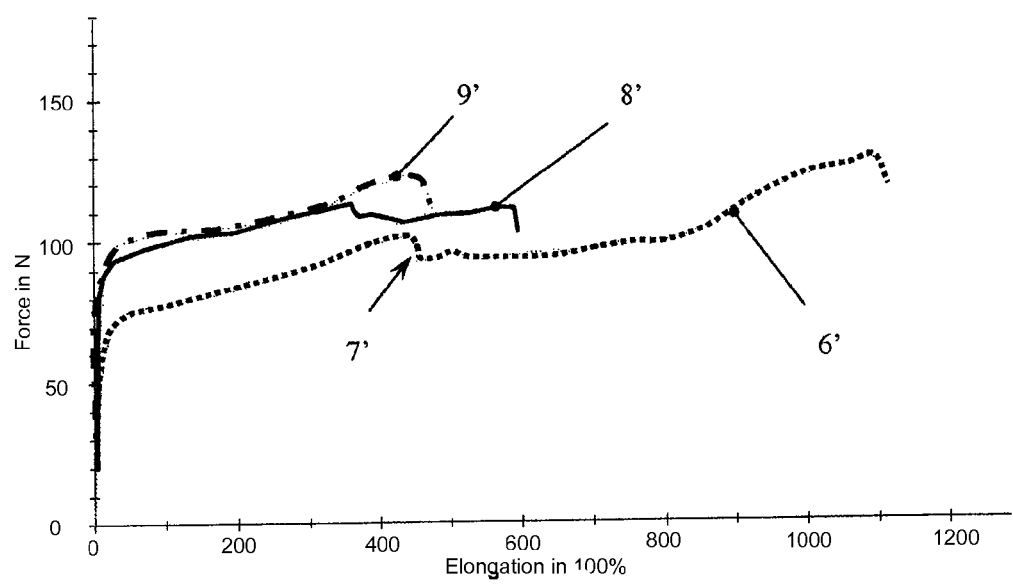
FIG. 3 is a graph showing the tearing and elongation behavior of films according to the invention in a transverse direction in comparison with a film from the prior art.

FIG. 3 shows the corresponding results of the tearing and elongation behavior of the film according to the invention in the transverse direction.

The longitudinal and transverse directions are in this case perpendicular to each other, the direction of production (direction of rolling, direction of extrusion) of the film being defined as the longitudinal direction and the direction perpendicular to the direction of production being defined as the transverse direction. The respective tearing and elongation behavior shown here, during the triggering of the airbag, relates moreover to the film as a whole, that is to say to the film laminate as a whole, containing the two-ply cover layer and the foamed layer, not for instance to individual plies of the film.

Curve 6 shows here the tearing-elongation behavior of a film from the prior art in the longitudinal direction on the basis of the tensile elongation values, the tensile force being plotted against the elongation. The curve 6' shows the corresponding values for the transverse direction. It can be clearly seen here that, after the breaking of the foam at point 7 (longitudinal direction) and 7' (transverse direction) after approximately over 400% elongation, the elongation of the cover layer increases to values of up to 1,200% before the film tears.

The curves 8 and 9 for the longitudinal direction and 8' and 9' for the transverse direction respectively show the tearing-elongation behavior of two films according to the invention, in the case of which on the one hand no noticeable jump in the breaking of the foam can be seen and on the other hand the tearing of the overall construction takes place at the moment at which the foam also tears, namely at elongations of the order of 300 to 600%.

The invention claimed is:

1. A thermoplastic film, comprising:
a compact cover layer having a three-dimensionally structured surface;
a foamed layer disposed on an underside of said compact cover layer, the thermoplastic film being applied in a shaping processing step to a support corresponding to a form of a component and thereby receiving its component form; and
said compact cover layer being uniformly compliant and of an at least two-ply form, containing an outer ply without weakening lines and an inner ply without weakening lines adjacent said foamed layer, said inner ply of said compact cover layer and said foamed layer having an elongation at tear being less than an elongation at tear of said outer ply of said compact cover layer.

2. The thermoplastic film according to claim 1, wherein the elongation at tear of said inner ply on breaking in a longitudinal direction is less than or equal to 600% and in a transverse direction is less than or equal to 500% of a respective original dimension.

3. The thermoplastic film according to claim 2, wherein the elongation at tear of said inner ply on breaking in the longitudinal direction is less than or equal to 500%, and in the transverse direction less than or equal to 400% of the respective original dimension.

4. The thermoplastic film according to claim 1, wherein a tearing resistance of said inner ply in a longitudinal direction and in a transverse direction is 8 to 25 MPa.

5. The thermoplastic film according to claim 1, wherein said inner and outer plies of said compact cover layer have a thickness of in each case 0.2 to 0.6 mm.

6. The thermoplastic film according to claim 1, wherein the elongation at tear of said foamed layer on breaking in a longitudinal direction is less than or equal to 400% and in a transverse direction is less than or equal to 300% of a respective original dimension.

7. The thermoplastic film according to claim 6, wherein the elongation at tear of said foamed layer on breaking in the longitudinal direction is less than or equal to 300%, and in the transverse direction is less than or equal to 200% of the respective original dimension.

8. The thermoplastic film according to claim 1, wherein said foamed layer has a thickness of 0.5 to 4 mm.

9. The thermoplastic film according to claim 1, wherein said foamed layer has a density of 40 to 300 kg/m$^3$.

10. The thermoplastic film according to claim 2, wherein the elongation at tear of said inner ply on breaking in the longitudinal direction is less than or equal to 400%, and in the transverse direction is less than or equal to 300% of the respective original dimension.

11. The thermoplastic film according to claim 1, wherein a tearing resistance of said inner ply in a longitudinal direction and in a transverse direction is 10 to 15 MPa.

12. The thermoplastic film according to claim 1, wherein said inner and outer plies of said compact cover layer have a thickness of in each case 0.2 to 0.4 mm.

13. The thermoplastic film according to claim 6, wherein the elongation at tear of said foamed layer on breaking in the longitudinal direction is less than or equal to 200%, and in the transverse direction is less than or equal to 150% of the respective original dimension.

14. The thermoplastic film according to claim 1, wherein said foamed layer has a density of 40 to 200 kg/m$^3$.

15. The thermoplastic film according to claim 1, wherein said foamed layer has a density of 40 to 200 kg/m$^3$.

16. The thermoplastic film according to claim 1, wherein the thermoplastic film is for airbag covers for interior trim of motor vehicles.

17. An interior trim part for a motor vehicle, comprising:
a thermoplastic film containing a compact cover layer having a three-dimensionally structured surface and a foamed layer disposed on an underside of said compact cover layer, said thermoplastic film being applied in a shaping processing step to a support corresponding to a form of a component and thereby receiving its component form, said compact cover layer being uniformly compliant and of an at least two-ply form at least in one of a region of airbag covers and in a region of tear-open seams of the airbag covers, said two-ply form having an outer ply without weakening lines and an inner ply without weakening lines adjacent said foamed layer, said inner ply of said compact cover layer and said foamed layer having an elongation at tear which is less than an elongation at tear of said outer ply of said cover layer.

18. The interior trim part for the motor vehicle according to claim 17, wherein the interior trim part is a dashboard.

19. A thermoplastic film, comprising:
a compact cover layer having a three-dimensionally structured surface;
a foamed layer disposed on an underside of said compact cover layer, the thermoplastic film being applied in a shaping processing step to a support corresponding to a form of a component and thereby receiving its component form; and
said compact cover layer being uniformly compliant and of an at least two-ply form, containing an outer ply having a substantially uniform thickness and an inner ply having a substantially uniform thickness adjacent said foamed layer, said inner ply of said compact cover layer and said foamed layer having an elongation at tear being less than an elongation at tear of said outer ply of said compact cover layer.

\* \* \* \* \*